United States Patent
Kukla et al.

(10) Patent No.: US 11,637,343 B2
(45) Date of Patent: Apr. 25, 2023

(54) CHARGER OPERABLE IN DIFFERENT CHARGING MODES FOR CHARGING AN ACCUMULATOR OF THE CHARGER AND AN ACCUMULATOR OF AN AUDIO DEVICE

(71) Applicant: SIVANTOS PTE. LTD., Singapore (SG)

(72) Inventors: Christoph Kukla, Trabitz (DE); Stefan Aschoff, Eckental (DE)

(73) Assignee: Sivantos Pte. Ltd., Singapore (SG)

( * ) Notice: Subject to any disclaimer, the term of this patent is extended or adjusted under 35 U.S.C. 154(b) by 300 days.

(21) Appl. No.: 17/024,986

(22) Filed: Sep. 18, 2020

(65) Prior Publication Data

US 2021/0083347 A1 Mar. 18, 2021

(30) Foreign Application Priority Data

Sep. 18, 2019 (EP) .................................... 19197914

(51) Int. Cl.
| | | |
|---|---|---|
| *H01M 10/46* | (2006.01) | |
| *H01M 12/08* | (2006.01) | |
| *H02J 50/12* | (2016.01) | |
| *H02J 7/02* | (2016.01) | |
| *H04R 25/00* | (2006.01) | |

(52) U.S. Cl.
CPC ............... *H01M 12/08* (2013.01); *H02J 7/02* (2013.01); *H02J 50/12* (2016.02); *H01M 2220/30* (2013.01); *H04R 25/552* (2013.01); *H04R 25/602* (2013.01)

(58) Field of Classification Search
CPC .. H02J 7/02; H02J 7/0013; H02J 7/342; H02J 7/0068; H02J 2300/30; H02J 50/12; H01M 12/08; H01M 2220/30; H01M 8/00; H04R 2225/31; H04R 1/1025; H04R 25/552; H04R 25/602
USPC .................. 320/101, 103, 114, 115, 132, 149
See application file for complete search history.

(56) References Cited

U.S. PATENT DOCUMENTS

| | | | |
|---|---|---|---|
| 2008/0136369 A1 | 6/2008 | Klemenz et al. | |
| 2008/0241622 A1* | 10/2008 | Matsuoka ......... | H01M 8/04164 429/437 |
| 2011/0204842 A1 | 8/2011 | Nagasaki et al. | |
| 2011/0300468 A1 | 12/2011 | Takabayashi et al. | |
| 2014/0009111 A1* | 1/2014 | Nagasaki ............. | H02J 7/0042 320/108 |
| 2017/0064429 A1 | 3/2017 | Hirsch et al. | |

FOREIGN PATENT DOCUMENTS

| | | |
|---|---|---|
| EP | 1921894 A2 | 5/2008 |
| JP | 2004253189 A | 9/2004 |
| KR | 20070108796 A | 11/2007 |
| WO | 2009100981 A1 | 8/2009 |

\* cited by examiner

*Primary Examiner* — Edward Tso
(74) *Attorney, Agent, or Firm* — Laurence A. Greenberg; Werner H. Stemer; Ralph E. Locher

(57) ABSTRACT

A charger for charging an audio-device-accumulator of an audio device which is wearable on a head of a user and contains an interface for the transfer of electrical energy to the audio-device-accumulator. The charger contains an energy source configured as a hybrid battery for supplying the interface in a first charging mode. The hybrid battery contains a charger-accumulator and a fuel cell.

17 Claims, 1 Drawing Sheet

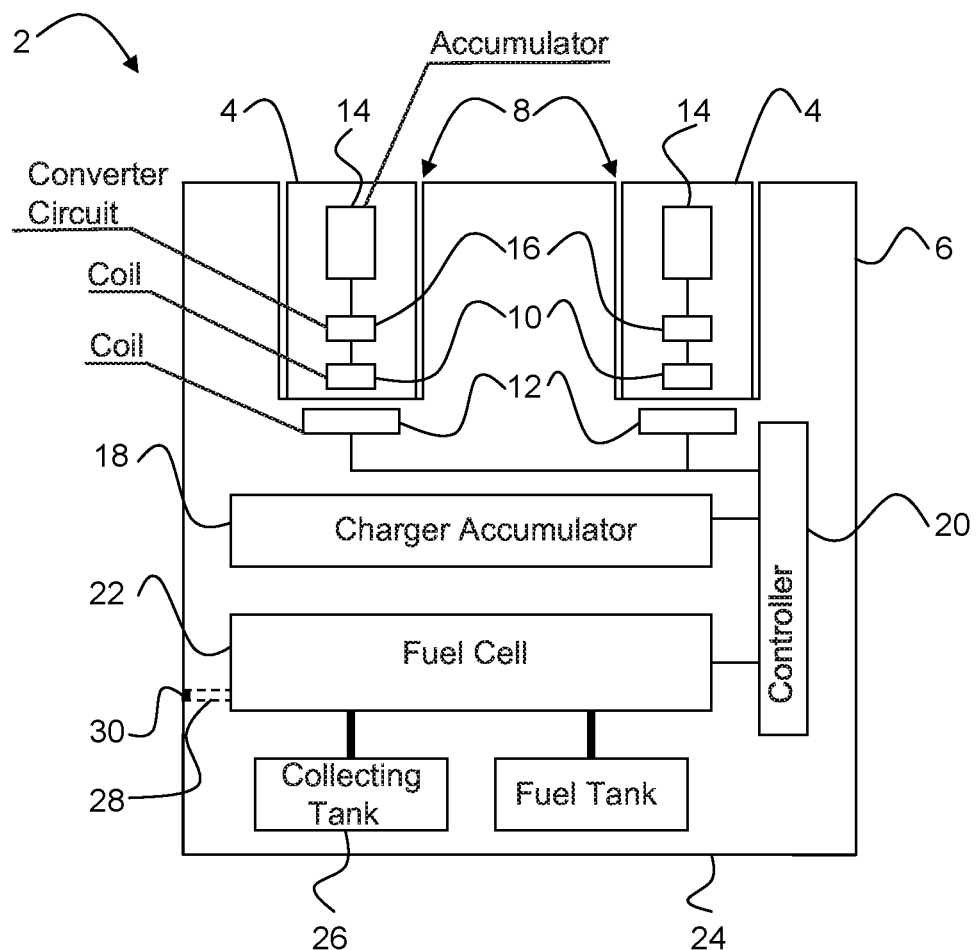

CHARGER OPERABLE IN DIFFERENT CHARGING MODES FOR CHARGING AN ACCUMULATOR OF THE CHARGER AND AN ACCUMULATOR OF AN AUDIO DEVICE

CROSS-REFERENCE TO RELATED APPLICATION

This application claims the priority, under 35 U.S.C. § 119, of European patent application EP 19 197 914, filed Sep. 18, 2019; the prior application is herewith incorporated by reference in its entirety.

BACKGROUND OF THE INVENTION

Field of the Invention

The invention relates to a charger for charging an audio-device-accumulator of an audio device which is wearable on a user's head and contains an interface for the transfer of electrical energy to the audio-device-accumulator.

There are different types of audio devices known which are wearable. One of these types is called a hearing aid.

"Hearing aids" typically refers to classic hearing aids that are used to assist the hard-of-hearing. In a wider sense, however, this term also refers to devices that are configured to assist people of normal hearing, and are thus not provided to compensate for hearing loss, but are employed for a specific purpose to assist and improve the normal human hearing capacity in specific hearing situations.

Regardless of the intended application, hearing aids of this sort typically comprise an input transducer, a signal processing apparatus and an output transducer as important components. Many hearing aids furthermore comprise a hearing aid accumulator. The hearing aid accumulator here can be charged with the aid of a suitably designed charger. Examples of appropriate chargers can be found in international patent disclosure WO 2009/100981 A1 and European patent application EP 1 921 894 A2.

BRIEF SUMMARY OF THE INVENTION

On this basis, the invention is based on the object of providing an advantageously designed charger.

This object is achieved according to the invention by a charger with the features of the independent claim. Preferred developments are contained in the claims that are dependent thereon.

The corresponding charger is configured here for charging an audio-device-accumulator of an audio device and contains an interface for the transfer of electrical energy to the audio-device-accumulator. Depending on the use case the audio device is configured as an earphone, a headphone, as a headset, as a hearable, as a personal sound amplifier (PSAP) or so.

It is preferably configured as a hearing aid and in this case the audio-device-accumulator is configured as a hearing-aid-accumulator. The charger is furthermore preferably designed for the simultaneous charging of a pair of hearing aids of a hearing aid system, and thus for the simultaneous charging of a pair of hearing aid accumulators via the interface. A corresponding hearing aid system here is preferably designed as a binaural hearing aid system, and contains a hearing aid for a right ear and a hearing aid for a left ear.

The charger furthermore contains an energy source configured as a type of hybrid battery for feeding or supplying the interface in a first charging mode. The hybrid battery here contains a charger-accumulator and a fuel cell.

In the sense used in this application, the term "accumulator", no matter if audio-device-accumulator, hearing-aid-accumulator or charger-accumulator, refers both to a single accumulator cell as well as to a grouping of a plurality of accumulator cells. This means that, depending on the particular application, the charger contains only a single accumulator cell or alternatively a plurality of accumulator cells. Regardless of this, however, only an accumulator is discussed below. Analogously, the term "fuel cell" as used below represents both a single fuel cell and a grouping of a plurality of fuel cells, and, depending on the implementation variant, the charger then contains either one or a plurality of fuel cells.

The charger, as already mentioned, is furthermore preferably configured for the simultaneous or parallel charging of the audio-device-accumulators of an audio device system of two audio devices and especially of the hearing-aid-accumulators of a hearing aid system of two hearing aids. For the sake of simplicity, however, "the audio device" is always discussed below. The extension to more than one audio device is, however, always possible for an expert, without having to exercise inventive activity.

The charger for each audio device here preferentially contains a receptacle into which the audio device is to be placed or inserted for charging. In any event, however, the audio device is to be brought for charging into a charging position in which the audio device is connected to the interface or is coupled to the interface.

The charger furthermore is preferably designed or configured as a so-called mobile charger. This means that the charger can be used as an additional, mobile accumulator, similar to a so-called powerbank. Depending on the use case the charger typically has a volume with a value less than 1.5 $dm^3$ and especially less than 1 $dm^3$. The interface is, however, designed as an interface specifically for the audio device or the audio device system.

The interface, in turn, contains for example at least one contact element for creating a galvanic connection. Alternative the interface is designed for contactless or for wireless charging, so for example for inductive charging, resonance charging, optical charging or radio frequency charging, and contains for example an antenna, a coil and/or a capacitor element for a contactless energy transfer. In the charging position, a contact of the audio device additionally touches the contact element of the charger, or however an antenna, a coil and/or a capacitor element of the audio device is preferably located in the near field region of the antenna, of the coil and/or of the capacitor element of the charger, so that, so to speak, the antenna, the coil and/or the capacitor element of the audio device is coupled with the antenna, the coil and/or the capacitor element of the charger.

As already presented above, the charger is preferably designed as a mobile charger. The charger-accumulator of the charger is here further preferably designed to fully charge the audio device or the audio device system between one and three times. The charging capacity of the charger-accumulator is therefore selected so that the audio device or the audio device system can be fully charged between one and three times. A variant implementation is here particularly considered advantageous in which the accumulator is designed to fully charge the audio device or the audio device system precisely one time.

Independently of this, the charger-accumulator of the charger is preferably designed as a so-called lithium-ion accumulator.

It is further favorable if the fuel cell is designed as a so-called direct alcohol fuel cell. A direct methanol fuel cell (DMFC) or a direct ethanol fuel cell (DEFC) is particularly preferred here. In these cases, an alcohol, together with oxygen from the air, i.e. ambient air, is converted to water and carbon dioxide in the fuel cell. Alternative the fuel cell is designed as a so-called proton exchange membrane fuel cell (PEMFC), as a so-called phosphoric acid fuel cell (PAFC) or as a so-called alkaline fuel cell (AFC).

Regardless of the precise design of the charger-accumulator and the precise design of the fuel cell, the charger is preferably configured to supply or feed the interface exclusively with electrical energy from the charger-accumulator. In this case, the audio-device-accumulator of the audio device is then charged during the charging process, thus especially in a first charging mode or during a first charging process, only with electrical energy from the charger-accumulator. The fuel cell is then inactive during the charging of the audio-device-accumulator, or charges the charger-accumulator of the charger in parallel.

Independently of this, the charger is preferably designed in such a way that a charging process and especially the first charging process can be controlled or is controlled by an audio device which is charged by the charging process. In such a case a control unit of the audio device preferably regulates the charging amperage to the audio-device-accumulator of the audio device. The control unit regulates then the charging amperage for example dependent on the charging status of the audio-device-accumulator. Typically, the control unit regulates the charging amperage to a higher level if the audio-device-accumulator is nearly empty and to a lower level if the audio-device-accumulator is nearly fully loaded.

Preferably, the charger is configured so that the fuel cell is inactive while the audio-device-accumulator of the audio device is charged, thus especially in the first charging mode or the first charging process. A type of series circuit is thus preferably realized in which the interface, the charger-accumulator and the fuel cell are so to speak connected in series. Electric energy from the fuel cell can thus then only flow via the detour through the charger-accumulator of the charger, and not directly to the interface.

Furthermore preferred, the charger is configured so that the fuel cell charges the charger-accumulator of the charger in a second charging mode or during a second charging process. So, in the first charging mode the charger-accumulator of the charger charges the audio-device-accumulator of the audio device and in the second charging mode the fuel cell charges the charger-accumulator of the charger. In addition, it is preferred that the charger is designed in such a way that the first charging mode and the second charging mode do not run at the same time or are not activated at the same time. With other words the charger is preferably designed in such a way that there is no operation mode or situation in which the first charging process and the second charging process are running at the same time or in which they are activated at the same time. This ensures for example that the charger-accumulator of the charger is significantly discharged each time the audio-device-accumulator of the audio device is charged. Preferably, the charger-accumulator is completely discharged when the audio-device-accumulator is fully charged. Alternatively, a residual charge for example of about 10% of the charging capacity remains in the charger-accumulator. In any case the charger-accumulator is preferably significantly discharged. This is beneficial to the charger-accumulators lifespan and allows, for example, a higher number of charging cycles during the lifespan.

The maximum charging voltage $U_1$ with which the audio-device-accumulator is charged during a charging process and especially during the first charging process typically has a value between 0.5 V and 5 V. The maximum charging amperage $I_1$ typically has a value between 10 mA and 800 mA. The maximum power $P_1$ typically has a value between 5 mW and 4 W. The charger is preferably designed to provide the power for such a charging process and especially for several parallel charging processes like this. Furthermore, the charger is preferably designed to provide power with a value less than 50 W and especially less than 20 W.

The maximum charging voltage $U_2$ of the fuel cell with which the charger-accumulator is charged during a charging process and especially during the second charging process typically has a value between 0.5 V and 3 V. Preferred the charger is designed so that $AU_1=U_2$ with A between 0.1 and 0.8 and especially between 0.1 and 0.5. The maximum charging amperage $I_2$ of the fuel cell typically has a value between 10 mA and 400 mA. Preferred the charger is designed so that $AI_1=I_2$ with A between 0.1 and 0.8 and especially between 0.1 and 0.5. So the second charging process is typically a slower charging process than the first charging process.

If, in particular, the fuel cell is inactive in the first charging mode, it is moreover expedient if the charger is designed to charge the charger-accumulator of the charger by means of the fuel cell in the second charging mode as mentioned above. In this case, the fuel cell then generates electric energy in the second charging mode, and the charger-accumulator is charged with this. The flow of energy from the fuel cell to the charger-accumulator of the charger is here typically significantly lower than the flow of energy from the charger-accumulator of the charger to the audio-device-accumulator. The charger-accumulator of the charger is then discharged significantly faster in the first charging mode than it is charged up in the second charging mode.

The charger-accumulator and the fuel cell are thus preferably not used as energy sources in parallel, but in alternation. The charger-accumulator here serves as the energy source for the supply of the interface, and thus for charging the audio-device-accumulator of the audio device. The fuel cell serves in a complementary manner for charging the charger-accumulator.

It is furthermore favorable in this connection if the charger is designed in such a way that the second charging mode is started automatically when the first charging mode is finished. In accordance with one variant implementation, the charger is here designed to start the second charging mode when the audio device is removed from the charging position mentioned above, i.e., for example, is taken out of the receptacle.

In accordance with an alternative variant implementation, the second charging mode is not started when the first charging mode is ended, but is instead started when the charger-accumulator has discharged to the point that a predefined threshold value for the charge state is fallen below.

It is furthermore expedient if the second charging mode is ended automatically and the fuel cell is deactivated when the charger-accumulator is fully charged or when a second predefined threshold value for the charge state is reached or exceeded.

Alternatively or in addition to this, the charger comprises an operating element by means of which the second charging mode can be started and ended manually by an operator. Such an operating element is expediently supplemented by a display which is part of the charger and which indicates the charge state of the charger-accumulator.

It is furthermore expedient if the charger contains a fuel container. This is typically exchangeable and/or refillable. The fuel container serves to store one of the reactants that are necessary for the operation of the fuel cell, i.e. in particular an alcohol.

It is considered advantageous here if the fuel container has a volume such that sufficient electrical energy can be generated by means of the fuel cell to fully charge the accumulator approximately 15 to 100 times with one fuel filling. The fuel container here preferably has a volume in the range from about 0.5 cm$^3$ up to about 3.5 cm$^3$.

According to at least one variant implementation, the charger furthermore contains a collecting container for one of the reaction products of the fuel cell, i.e. in particular for water. The collecting container here can typically be emptied and/or exchanged.

Alternatively or in addition, the charger contains an outlet for one of the reaction products of the fuel cell, in particular for water. This means that the charger in particular contains a housing with an outlet through which the corresponding reaction product escapes to the outside and is thus led out of the charger.

In an advantageous development, the outlet contains a nonwoven or a membrane, wherein in this case the membrane is typically at least partially permeable for the reaction product, i.e. in particular for water or water vapor. In this case, the outlet is then designed such that the reaction product escapes through it to the outside and/or that the reaction product evaporates to the outside.

The charger is, in addition, preferably configured to determine, and if relevant also to display, a filling level of the fuel container. The charger contains for example a type of counter for this purpose, with which the charging cycles in which the accumulator is charged through the operation of the fuel cell are counted. Starting from a complete filling of the fuel container, the consumption, and thus the current filling level of the fuel container, can then be deduced from the number of charging cycles. Alternatively, a type of time counter is realized, with which the operating duration of the fuel cell, taken over all the charging cycles, is captured.

According to one variant implementation, the ascertained filling level of the fuel container is indicated via a display of the charger. Alternatively or in addition, this information is transmitted from the charger, for example to a device that can be coupled to the charger such as, for example, a smartphone, or to a service technician, for example through transmission to a server. A corresponding transmission here typically takes place via a radio connection.

Regardless of this, it is advantageous if a corresponding counter can be reset. It is further preferable here if resetting the counter does not take place through a simple operating element outside on the charger, but through an operating element inside the housing or by means of a type of software update by a service technician.

Other features which are considered as characteristic for the invention are set forth in the appended claims.

Although the invention is illustrated and described herein as embodied in a charger, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram of a charger with two audio devices which are exemplary designed as hearing aids according to the invention.

DETAILED DESCRIPTION OF THE INVENTION

Referring now to the single FIGURE of the drawing in detail, there is shown a charger 2, described by way of example below and shown in a type of block diagram, and is configured for charging audio devices which are exemplary designed as hearing aids 4 and, in particular, for the simultaneous charging of a pair of hearing aids 4 of a hearing aid system. The hearing aid system here is preferably designed as a binaural hearing aid system and contains a hearing aid 4 for a right ear and a hearing aid 4 for a left ear.

In the exemplary embodiment, the charger 2 contains for this purpose a housing 6 with two receptacles 8, wherein each receptacle 8 is designed to accept a hearing aid 4 of the hearing aid system. If one of the hearing aids 4 is then arranged in the receptacle 8 provided for it, or in one of the two receptacles 8, then the corresponding hearing aid 4 is in a charging position. In this charging position, a receiving coil 10 of the corresponding hearing aid 4 is arranged in the near field region of a transmitting coil 12 of the charger 2, whereby an inductive charging process is enabled.

The transmitting coil 12 of the charger 2 serves in the exemplary embodiment as the interface of the charger 2 for the transmission of electrical energy to the corresponding hearing aid 4 and, in particular, to a hearing-aid-accumulator 14 in the corresponding hearing aid 4. If a first charging mode is then started, the interface is supplied with electrical energy, and electrical energy is transmitted from the transmitting coil 12 to the receiving coil 10. By means of the electrical energy transmitted in this way, the hearing-aid-accumulator 14 is then charged via a converter circuit 16 in the corresponding hearing aid 4.

If a respective hearing aid 4 is positioned in the two receptacles 8, then in the first charging mode both hearing aids 4 are charged simultaneously, whereby an interface with its own transmitting coil 12 is provided for each receptacle 8 for this purpose.

In the first charging mode the interface of the charger 2 is fed or supplied by a charger-accumulator 18. In doing so, the charger-accumulator 18 is discharged, and the electrical energy out of the charger-accumulator 18 is fed via a control unit 20 to the interface of the charger 2. The control unit 20 here typically contains a first converter circuit or first converter circuitry through which the electrical energy is fed to the interface.

The charger 2 contains, in addition, a fuel cell 22 which in the exemplary embodiment is designed as a direct methanol fuel cell (DMFC). In the first charging mode, the fuel cell 22 is preferably inactive, and the charger 2 is further preferably configured such that electrical energy generated by the fuel cell 22 cannot be supplied directly to the interface.

The fuel cell 22 serves instead to charge the charger-accumulator 18, wherein electrical energy generated by means of the fuel cell 22 is fed for this purpose via the control unit 20 of the charger 2 into the charger-accumulator 18. The control unit typically contains for this purpose a second converter circuit or second converter circuitry, via which the electrical energy generated by means of the fuel cell 22 in a second charging mode reaches the charger-accumulator 18.

In the exemplary embodiment, the control unit 20 is furthermore designed such that the second charging mode is started automatically when the first charging mode is finished. The second charging mode is, in addition, stopped automatically as soon as the charger-accumulator 18 is fully charged.

The control unit 20 is preferably also designed to start the first charging mode automatically and to end it automatically. The first charging mode is preferably started here when a hearing aid 4 is inserted into one of the receptacles 8, and the first charging mode is ended when there is no longer a hearing aid 4 in a charging position.

In the exemplary embodiment, the charger 2 further contains a fuel container 24 as well as a collecting container 26. The fuel container 24 here is designed to accept methanol as fuel, and this fuel is fed to the fuel cell 22 as one of the two reactants in the second charging mode. In the second charging mode, ambient air, and therefore oxygen, is also fed to the fuel cell 22 through an opening, not illustrated, in the housing 6. When the fuel cell 22 is operating, carbon dioxide and water are then generated as reaction products. In the exemplary embodiment, the carbon dioxide is released to the surroundings via a further opening, not illustrated, in the housing 6, whereas the water is collected in the collecting container 26. The collecting container 26 is preferably designed here such that it can be emptied, and the fuel container 24 is designed to be fillable.

In the exemplary embodiment, the fuel container further forms a part of the housing 6, and thus a part of the surface that bounds the charger 2 to the outside. This part is transparent in design, so that the filling level of the fuel container 24 is visible from the outside.

As an alternative to the collecting container 26, the charger 2 has an outlet 28 via which the reaction product water is led away to the outside. This outlet is indicated in the FIGURE by dotted lines. At the end, the outlet 28 preferably comprises a membrane 30 that is at least partially permeable for water or water vapour.

The following is a summary list of reference numerals and the corresponding structure used in the above description of the invention:

2 Charger
4 Hearing aid
6 Housing
8 Receptacle
10 Receiving coil
12 Transmitting coil
14 Hearing-aid-accumulator
16 Converter circuit
18 Charger-accumulator
20 Control unit
22 Fuel cell
24 Fuel container
26 Collecting container
28 Outlet
30 Membrane

The invention claimed is:

1. A charger for charging an audio-device-accumulator of an audio device being wearable on a head of a wearer, the charger comprising:

an interface for a transfer of electrical energy to the audio-device-accumulator; and an energy source configured as a hybrid battery for supplying said interface in a first charging mode, said hybrid battery having a charger-accumulator and a fuel cell;

the charger configured to have a first charging mode for charging the audio-device-accumulator of the audio device; and the charger configured to have a second charging mode in which said charger-accumulator of the charger is charged by said fuel cell.

2. The charger according to claim 1, wherein said charger-accumulator is a lithium ion accumulator.

3. The charger according to claim 1, wherein said fuel cell is a direct alcohol fuel cell.

4. The charger according to claim 1, wherein the charger is configured to supply said interface with the electrical energy exclusively from said charger-accumulator.

5. The charger according to claim 3, wherein the charger is configured to start a second charging mode when the first charging mode ends.

6. The charger according to claim 5, wherein the charger is configured to start the second charging mode when the audio device is removed from a charging position.

7. The charger according to claim 1, further comprising a fuel container connected to said hybrid battery.

8. The charger according to claim 7, wherein said fuel container has a volume such that sufficient electrical energy can be generated by means of said fuel cell to fully charge said charger-accumulator between 15 and 100 times with one fuel filling.

9. The charger according to claim 7, wherein said fuel container has a volume in a range between 0.5 cm$^3$ and 3.5 cm$^3$.

10. The charger according to claim 1, further comprising a collecting container for collecting a reaction product from said fuel cell.

11. The charger according to claim 1, further comprising an outlet for a reaction product of said fuel cell.

12. The charger according to claim 11, wherein said outlet contains a nonwoven or a membrane that is permeable to the reaction product.

13. The charger according to claim 7, wherein the charger is configured to ascertain a filling level of said fuel container.

14. A charger for charging an audio-device-accumulator of an audio device being wearable on a head of a wearer, the charger comprising:

an interface for a transfer of electrical energy to the audio-device-accumulator; and an energy source configured as a hybrid battery for supplying said interface in a first charging mode, said hybrid battery having a charger-accumulator and a fuel cell;

the charger configured to have a first charging mode for charging the audio-device-accumulator of the audio device;

the charger configured to have a second charging mode in which said charger-accumulator of the charger is charged by said fuel cell;

the charger configured to charge the audio-device-accumulator of the audio device with a maximum charging voltage $U_i$ in the first charging mode; and the charger configured to charge the charger-accumulator of the charger with a maximum charging voltage $U_2$ in the second charging mode; and $AU_1=U_2$ with A between 0.1 and 0.8.

15. The charger according to claim 14, wherein A is between 0.1 and 0.5.

16. A charger for charging an audio-device-accumulator of an audio device being wearable on a head of a wearer, the charger comprising:
- an interface for a transfer of electrical energy to the audio-device-accumulator; and
- an energy source configured as a hybrid battery for supplying said interface in a first charging mode, said hybrid battery having a charger-accumulator and a fuel cell;
- the charger configured to have a first charging mode for charging the audio-device-accumulator of the audio device;
- the charger configured to have a second charging mode in which said charger-accumulator of the charger is charged by said fuel cell;
- the charger configured to charge the audio-device-accumulator of the audio device with a maximum charging amperage $I_1$ in the first charging mode; and
- the charger configured to charge the charger-accumulator of the charger with a maximum charging amperage $I_2$ in the second charging mode; and $AI_1=I_2$ with A between 0.1 and 0.8.

17. The charger according to claim 16, wherein A is between 0.1 and 0.5.

* * * * *